United States Patent

Purves

(10) Patent No.: US 10,179,530 B2
(45) Date of Patent: Jan. 15, 2019

(54) SIMULTANEOUSLY ROTATABLE AND TRANSLATABLE VEHICLE HEAD RESTRAINT

(71) Applicant: WINDSOR MACHINE AND STAMPING (2009) LTD., Windsor (CA)

(72) Inventor: Robert Purves, Windsor (CA)

(73) Assignee: WINDSOR MACHINE AND STAMPING (2009) LTD., Windsor (CA)

( * ) Notice: Subject to any disclaimer, the term of this patent is extended or adjusted under 35 U.S.C. 154(b) by 0 days.

(21) Appl. No.: 15/700,642

(22) Filed: Sep. 11, 2017

(65) Prior Publication Data

US 2018/0072203 A1    Mar. 15, 2018

Related U.S. Application Data

(60) Provisional application No. 62/393,890, filed on Sep. 13, 2016.

(51) Int. Cl.
| | |
|---|---|
| *B60N 2/853* | (2018.01) |
| *B60N 2/838* | (2018.01) |
| *B60N 2/841* | (2018.01) |
| *B60N 2/868* | (2018.01) |
| *B60N 2/844* | (2018.01) |
| *B60N 2/847* | (2018.01) |

(52) U.S. Cl.
CPC ............. *B60N 2/853* (2018.02); *B60N 2/838* (2018.02); *B60N 2/841* (2018.02); *B60N 2/844* (2018.02); *B60N 2/847* (2018.02); *B60N 2/868* (2018.02)

(58) Field of Classification Search
CPC ........ B60N 2/868; B60N 2/847; B60N 2/844; B60N 2/853; B60N 2/838; B60N 2/841

USPC .......................................... 297/407, 406, 409
See application file for complete search history.

(56) References Cited

U.S. PATENT DOCUMENTS

| 2,306,334 | A | * | 12/1942 | Costas | ................. | B61D 33/005 |
| | | | | | | 297/407 |
| 4,762,367 | A | * | 8/1988 | Denton | .................. | B60N 2/865 |
| | | | | | | 297/409 |
| 4,856,848 | A | * | 8/1989 | O'Sullivan | ............ | B60N 2/865 |
| | | | | | | 297/391 |
| 8,939,512 | B2 | * | 1/2015 | Boes | .................... | B60N 2/4882 |
| | | | | | | 297/408 |
| 2003/0178880 | A1 | * | 9/2003 | Hannah | .................... | A61G 5/12 |
| | | | | | | 297/406 |
| 2008/0228359 | A1 | | 9/2008 | Uchida et al. | | |
| 2015/0232002 | A1 | | 8/2015 | Little | | |

FOREIGN PATENT DOCUMENTS

JP        59014529 A  *  1/1984

OTHER PUBLICATIONS

Search Report regarding related EP App. No. 17190521.9; dated Feb. 1, 2018; 8 pgs.

* cited by examiner

*Primary Examiner* — Milton Nelson, Jr.
(74) *Attorney, Agent, or Firm* — Cantor Colburn LLP

(57) ABSTRACT

A vehicle head restraint assembly includes a base portion coupleable to a vehicle seat back, the base portion including a cross member portion. Also included is a head restraint operatively coupled to the cross member portion and rotatable about the cross member portion. Further included is a helical drive assembly for translating the head restraint during rotation of the head restraint.

14 Claims, 6 Drawing Sheets

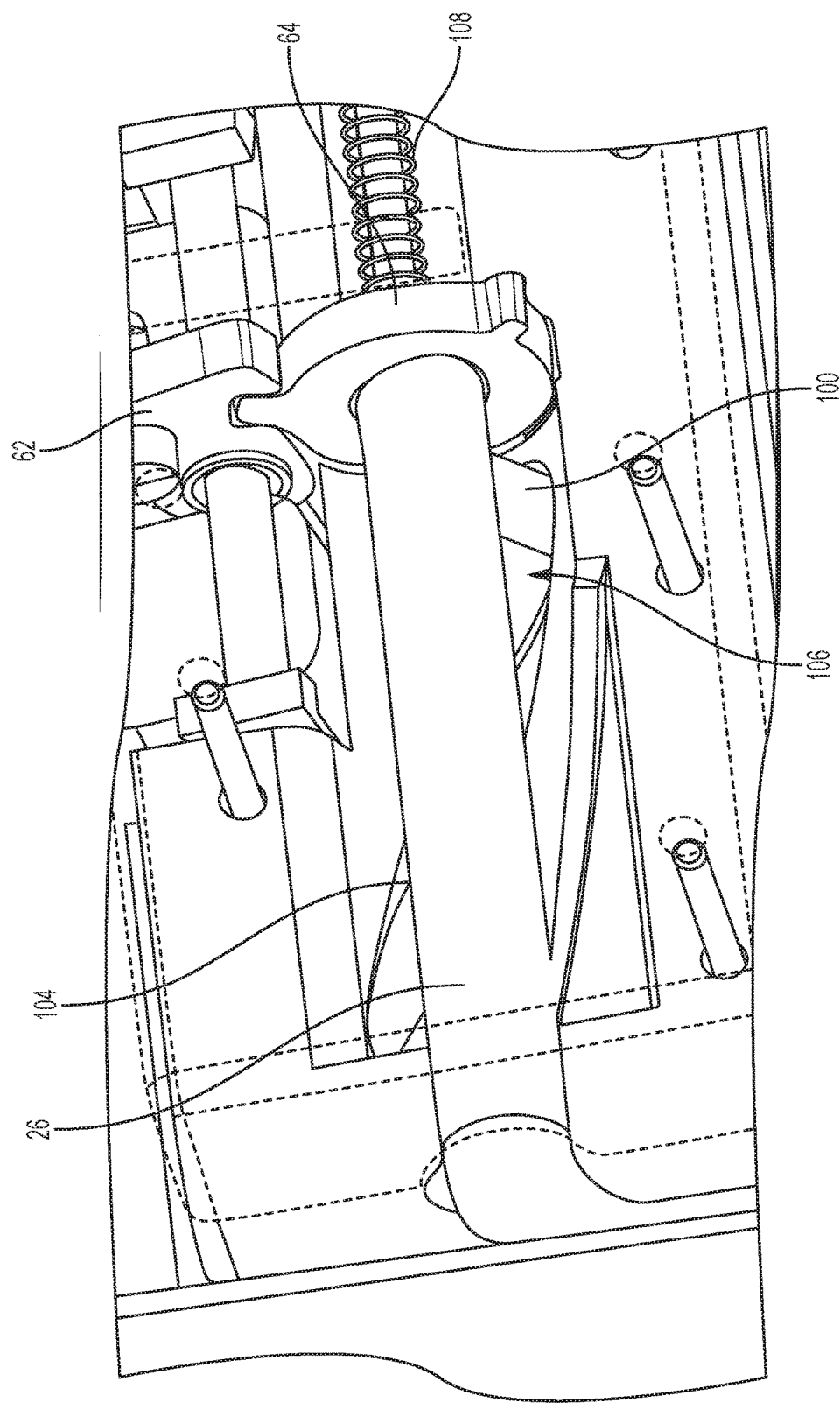

SIMULTANEOUSLY ROTATABLE AND TRANSLATABLE VEHICLE HEAD RESTRAINT

CROSS REFERENCE TO RELATED APPLICATION

This patent application claims the benefit of priority to U.S. Provisional Patent Application Ser. No. 62/393,890, filed Sep. 13, 2016, which is incorporated herein by reference in its entirety.

BACKGROUND OF THE INVENTION

The subject matter disclosed herein relates to head restraints and, more particularly, to a vehicle head restraint that is simultaneously rotatable and translatable.

Many vehicles, such as automobiles, include a headrest or head restraint atop an occupant's seat and in a position adjacent the occupant's head. Head restraints are typically cushioned for comfort, are height adjustable, and most are commonly finished in the same material as the rest of the seat.

BRIEF DESCRIPTION OF THE INVENTION

According to one aspect of the invention, a vehicle head restraint assembly includes a base portion coupleable to a vehicle seat back, the base portion including a cross member portion. Also included is a head restraint operatively coupled to the cross member portion and rotatable about the cross member portion. Further included is a helical drive assembly for translating the head restraint during rotation of the head restraint.

According to another aspect of the invention, a vehicle head restraint assembly includes a head restraint that is simultaneously rotatable and translatable in a cross-car direction of a vehicle.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7 is a perspective view of a helical drive of the head restraint assembly.

The detailed description explains embodiments of the invention, together with advantages and features, by way of example with reference to the drawings.

DETAILED DESCRIPTION OF THE INVENTION

Figure 1:
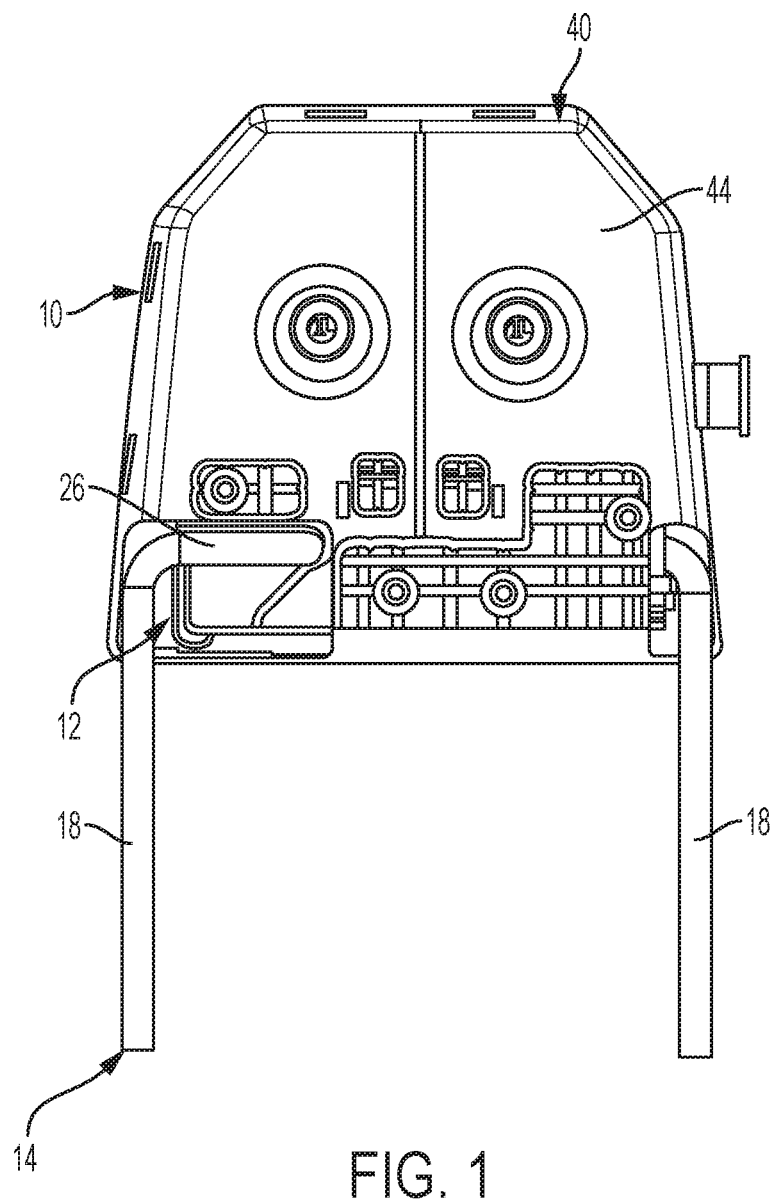
FIG. 1 is a perspective view of a head restraint assembly.

Referring to FIG. 1, a head restraint assembly 10 is depicted. The head restraint assembly 10 includes a base portion 14 (which may also be referred to as an "armature") that is mountable to a vehicle seat (not shown), and, more specifically, to the upper portion of the seatback of the vehicle seat. In the illustrated embodiment, the base portion 14 is formed from a single piece of metal and includes two parallel post portions 18 that are mounted, or mountable, to the top of the seatback of the vehicle seat, as understood by those skilled in the art. Each of the post portions 18 includes a respective elongated, straight portion. Each of the straight portions extends into a respective hole formed in the top of the seatback to attach the head restraint assembly 10 to the vehicle seat.

The head restraint assembly 10 is illustrated without a cover to show components partially or completely disposed therein. As shown, the base portion 14 also includes a cross member portion 26 that interconnects the two post portions 18. The cross member portion 26 extends substantially transversely relative to the post portions 18. For example, when the base portion 14 is connected to a vehicle seat, the post portions 18 are generally vertical, and the cross member portion 26 is generally horizontal.

The head restraint assembly 10 further includes a head restraint 40 operatively connected to the base portion 14. In the embodiment depicted, the head restraint 40 includes a housing 44 that provides rigid structure to the head restraint 40. A head restraint cushion is comprised of soft foam or a like material to provide a cushion between the head of a human occupant of the vehicle seat and the head restraint housing 44. The head restraint cover covers at least part of the cushion and the housing to enhance the aesthetics of the head restraint. Exemplary cover materials include cloth, vinyl, leather, etc.

The housing 44 at least partially defines an internal cavity 12 therein. The housing 44 may be formed of numerous contemplated materials. In one embodiment, the housing 44 is formed of plastic. Two apertures are defined by the cover and/or the housing 44 and are each configured to receive one of the posts 18. The posts 18 of the base portion extend through a respective one of the apertures to enter the internal cavity 12. The cross member portion 26 extends through the internal cavity 12.

Figure 2:
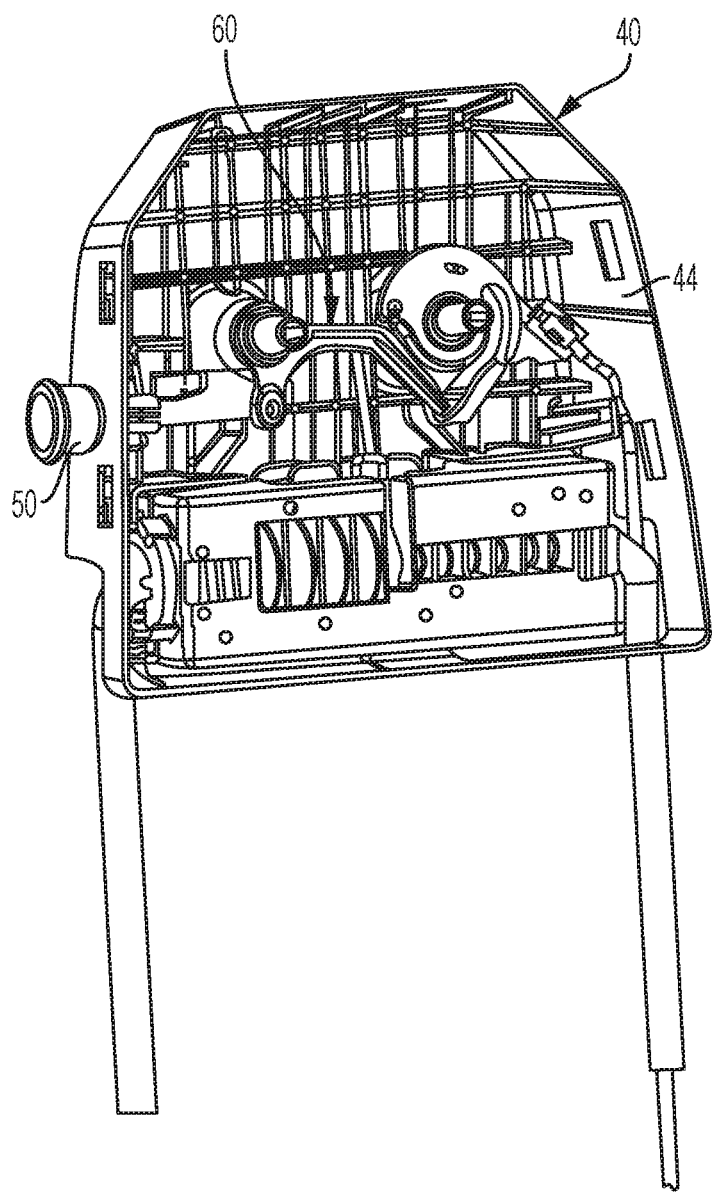
FIG. 2 is a perspective view of the head restraint assembly in an upright position.
Figure 3:
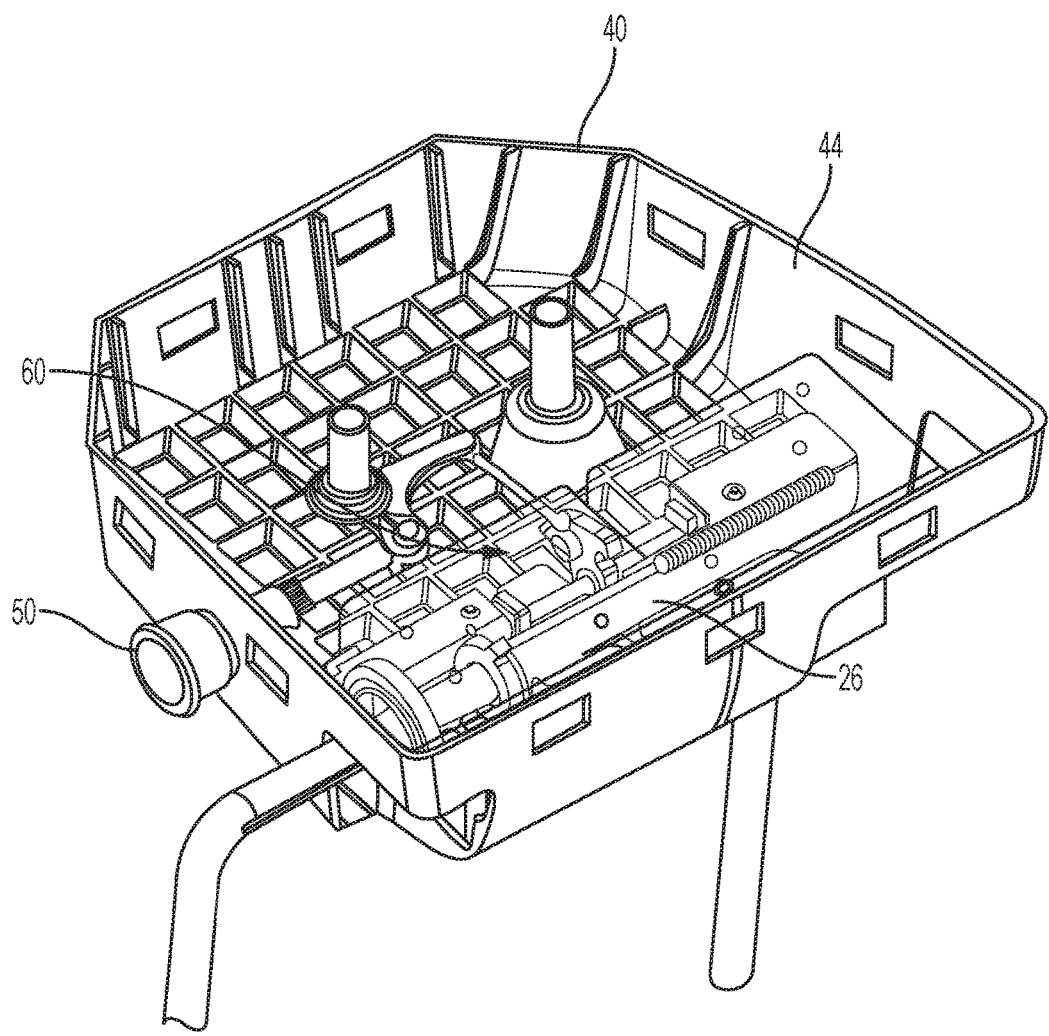
FIG. 3 is a perspective view of the head restraint assembly in a downwardly rotated position.

Referring to FIGS. 2 and 3, a portion of the housing 44 is removed to illustrate internal mechanisms and sub-assemblies of the head restraint 40. As shown, the head restraint 40 is pivotable about the cross member portion 26 between a substantially upright position (FIG. 2) and a downwardly rotated position (FIG. 3). The upright position is defined by a range of angular positions that are closer to a vertical orientation of the head restraint 40 than a horizontal orientation of the head restraint 40. The downward position is defined by a range of angular positions that are closer to the horizontal orientation of the head restraint 40 than the vertical orientation of the head restraint 40.

In some embodiments the head restraint 40 is rotatable about 90 degrees from a substantially vertical position to a substantially horizontal position. The head restraint 40 disclosed herein is also translatable in a direction A parallel to a longitudinal axis of the cross member portion 26 simultaneously with rotation of the head restraint 40. In some embodiments, the head restraint 40 is translatable up to about 55 millimeters, but it is to be appreciated that alternative distances may be employed to meet various application requirements. Simultaneous rotation and translation of the head restraint 40 is actuated upon manual pushing of a button 50 that protrudes from an exterior of the head restraint (and cover) and interacts with a locking mechanism 60, the button 50 accessible to a user, as described in detail herein.

Figure 5:
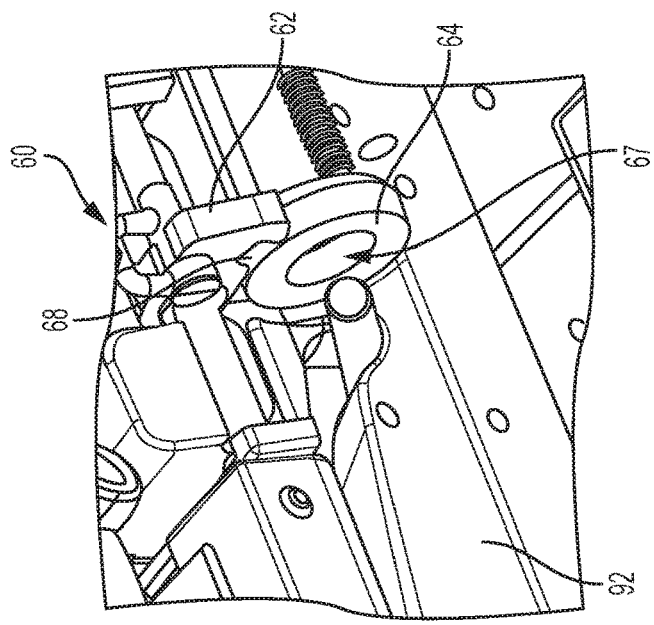
FIG. 5 is an enlarged perspective view of a lock mechanism of the head restraint assembly.
Figure 4:
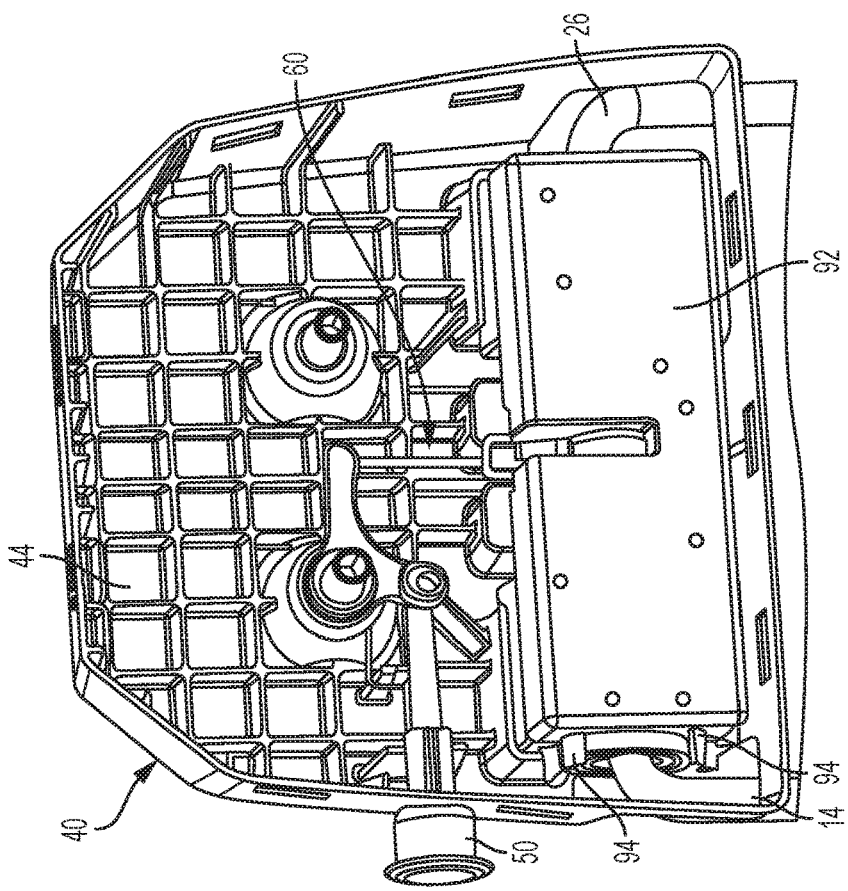
FIG. 4 is a perspective view of the head restraint assembly illustrating an internal cavity.
Figure 6:
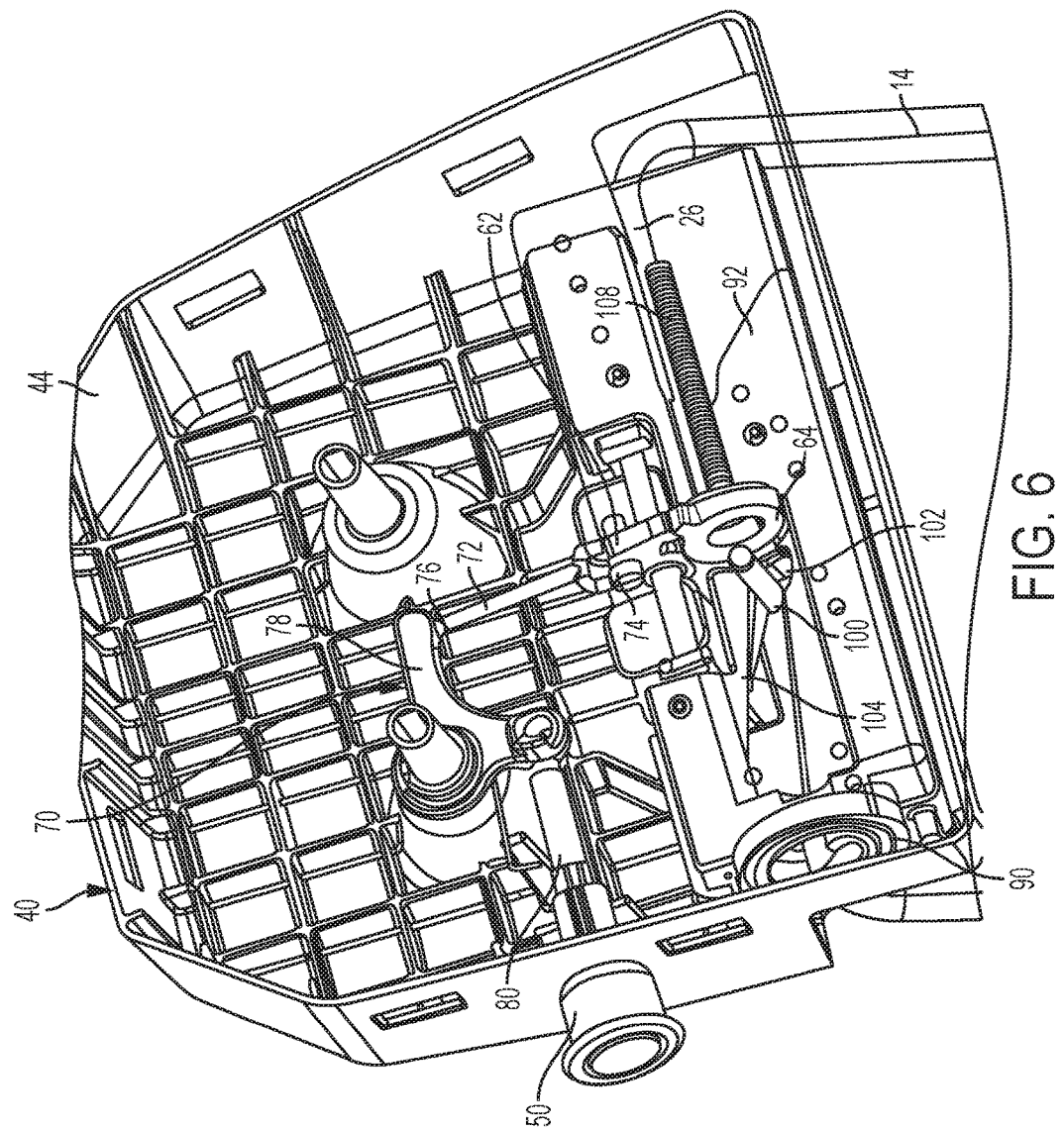
FIG. 6 is a perspective view of the head restraint assembly according to an aspect of the disclosure.

Referring to FIGS. 4-6, the locking mechanism 60 selectively locks the head restraint 40 with respect to the base portion 14, thereby preventing rotation of the head restraint 40 relative to the base portion 14. For example, the locking mechanism 60 locks the head restraint 40 in the upright position and may be selectively operated to allow the head restraint 40 to rotate forwardly, while simultaneously translating.

The locking mechanism 60 includes a first lock lever 62 and a second lock lever 64. The first lock lever 62 and the second lock lever 64 are engageable with each other with at least one protrusion extending from the first lock lever 62 and into engagement with a recess 68 or the like defined by the second lock lever 64. The second lock lever 64 defines an aperture 67 that surrounds the cross member portion 26 and may translate therealong, as described herein.

An actuator arm 70 is provided to facilitate operation of the lock mechanism 60. The actuator arm 70 is a linkage formed by a plurality of linkage segments. In one embodiment, the linkage segments are formed of plastic. A first linkage segment 72 is operatively coupled to the first lock lever 62. The coupled relationship between the first linkage segment 72 and the first lock lever 62 may be made in any suitable manner. For example, a pin, bolt or the like may be inserted through the components or a threaded relationship may be formed. Regardless of the precise coupling, the first linkage segment 72 is engaged at a first end 74 thereof. The first linkage segment 72 is operatively coupled at a second end 76 to a second linkage segment 78 that is coupled to the housing 44. Although described above as a coupled relationship between the first linkage segment 72 and the second linkage segment 78, the components are integrally formed with each other in some embodiments. One or more hinged portions are present in some embodiments to allow flexure during operation of the overall linkage (i.e., actuator arm 70).

The actuator arm 70 is selectively manipulated between a locked position and an unlocked position to impart movement of the first lock lever 62. The button 50 is operatively coupled to a push rod 80 that is in contact with, or integrally formed with, the second linkage segment 78 of the actuator arm 70. When the button 50 is depressed, it moves the push rod 80 against the actuator arm 70 such that the actuator arm 70 overcomes the bias of a spring and moves the first lock lever 62 to the unlocked position by disengaging it from the second lock lever 64.

A spring 90 is in contact with, and operatively coupled to, a cassette 92 of the head restraint 40. The cassette at least partially encloses at least a portion of the cross member portion 26. The spring 90 is a preloaded biasing member that is a clock spring in some embodiments. The spring 90 has about a 15 Newton preload in some embodiments. A portion of the spring 90 is seated within a recess of the cross member portion 26 and is retained thereto with at least one retention member 94. The preload of the spring 90 is in a direction that urges the head restraint forwardly upon disengagement of the first and second lock levers 62, 64. Therefore, upon pushing the button 50, the actuator arm 70 disengages the lock levers 62, 64 and the spring 90 rotates the head restraint 40 out of the locked position such that re-engagement of the lock levers 62, 64 does not occur. In some embodiments, the head restraint 40 is rotated about 15 degrees by the spring 90.

Referring to FIGS. 6 and 7, a pin 100 operatively coupled to the housing 44 is seated within a recess 102 of the cassette 92 in the locked position of the head restraint 40. The recess 102 retains the pin 100 at least partially therein in the locked position of the head restraint 40. The pin 100 extends from the housing 44 to a location adjacent to, or within, the cross member portion 26. In the unlocked position achieved by the rotation attributed to the spring 90, the pin 100 is moved relative to the cassette 92 out of the recess 102. In this position, the pin 100 is free to translate along a ramp wall 104 of a helical drive 106 defined by the cassette 92. The recess 102 is defined by a recess wall of the cassette 92 in the locked condition of the locking mechanism 60, the recess wall terminating at an end of the ramp wall 102 of the helical drive assembly 106, the helical drive assembly part of the cassette 92, the pin 100 moveable out of the recess 102 and along the ramp wall 104 in the unlocked condition of the locking mechanism 60.

A coil spring 108 is preloaded to translate the head restraint 40. The coil spring 108 is disposed within, or around, the cross member portion 26 of the base portion 14. The coil spring 108 is in abutment with the second lock lever 64 at a first end of the coil spring 108. During rotation of the head restraint 40, the coil spring 108 biases the head restraint 40 in a translational manner, relative to the second lock lever 64. The pin 100 is biased along the ramp 104 by the coil spring 108 during rotation of the head restraint 40. The helical drive 106 includes an angle that facilitates the desired amount of translation over a specified angular rotation.

Advantageously, the head restraint 40 is simultaneously translated during rotation thereof. This may be particularly beneficial if spatial constraints are present when the vehicle seat back is in a stowed position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vehicle head restraint assembly comprising:
   a base portion coupleable to a vehicle seat back, the base portion including a cross member portion;
   a head restraint operatively coupled to the cross member portion and rotatable about the cross member portion; and
   a helical drive assembly for translating the head restraint during rotation of the head restraint.

2. The vehicle head restraint assembly of claim 1, wherein the head restraint is rotatable between an upright position and a downward position.

3. The vehicle head restraint assembly of claim 2, wherein the upright position is defined by a range of angular positions that are closer to a vertical orientation of the head restraint than a horizontal orientation of the head restraint, the downward position defined by a range of angular positions that are closer to the horizontal orientation of the head restraint than the vertical orientation of the head restraint.

4. The vehicle head restraint assembly of claim 2, further comprising:

a locking mechanism operatively coupled to the cross member portion for retaining the head restraint in the upright position in a locked condition of the locking mechanism; and an actuator arm operatively coupled to the locking mechanism to actuate the locking mechanism to an unlocked condition of the locking mechanism.

5. The vehicle head restraint assembly of claim 4, wherein the actuator arm comprises a linkage arrangement.

6. The vehicle head restraint assembly of claim 5, further comprising a push button accessible to a user at an exterior location of the head restraint, the push button actuating the actuator arm to move the locking mechanism to the unlocked condition.

7. The vehicle head restraint assembly of claim 4, wherein the locking mechanism comprises a first lock lever and a second lock lever engaged with each other in the locked condition, the first lock lever operatively coupled to the actuator arm, the second lock lever surrounding the cross member portion and rotatable about the cross member portion when the locking mechanism is in the unlocked condition.

8. The vehicle head restraint assembly of claim 7, further comprising a cassette at least partially enclosing a portion of the cross member portion.

9. The vehicle head restraint assembly of claim 8, further comprising a pin operatively coupled to the head restraint and positioned within a recess defined by a recess wall of the cassette in the locked condition of the locking mechanism, the recess wall terminating at an end of a ramp wall of the helical drive assembly, the helical drive assembly part of the cassette, the pin moveable out of the recess and along the ramp wall in the unlocked condition of the locking mechanism.

10. The vehicle head restraint assembly of claim 9, further comprising a spring operatively coupled to the cross member portion outside of the helical drive assembly and in abutment with the second lock lever, the coil spring preloaded to translate the head restraint as the head restraint is rotated, the pin moveable along the ramp wall during rotation of the head restraint to guide translation of the head restraint relative to the locking mechanism.

11. A vehicle head restraint assembly comprising:

a head restraint that is simultaneously rotatable and translatable, the head restraint translatable in a cross-car direction of a vehicle, the head restraint rotatable between an upright position and a downward position;

a locking mechanism operatively coupled to a cross member portion of a base portion that is coupleable to a vehicle seat back, the locking mechanism retaining the head restraint in the upright position in a locked condition of the locking mechanism; and an actuator arm operatively coupled to the locking mechanism to actuate the locking mechanism to an unlocked condition of the locking mechanism.

12. The vehicle head restraint assembly of claim 11, further comprising a cassette at least partially enclosing the locking mechanism and a portion of the cross member portion.

13. The vehicle head restraint assembly of claim 12, further comprising a pin operatively coupled to the head restraint and positioned within a recess defined by a recess wall of the cassette in the locked condition of the locking mechanism, the recess wall terminating at an end of a ramp wall of the helical drive assembly, the helical drive assembly part of the cassette, the pin moveable out of the recess and along the ramp wall in the unlocked condition of the locking mechanism.

14. The vehicle head restraint assembly of claim 13, further comprising a spring operatively coupled to the cross member portion and in abutment with the locking mechanism, the coil spring preloaded to translate the head restraint as the head restraint is rotated, the pin moveable along the ramp wall during rotation of the head restraint to guide translation of the head restraint relative to the locking mechanism.

* * * * *